US010628938B2

(12) United States Patent
Kobayashi

(10) Patent No.: US 10,628,938 B2
(45) Date of Patent: Apr. 21, 2020

(54) CORRECTION INFORMATION GENERATION APPARATUS, AND CORRECTION INFORMATION GENERATION METHOD FOR CORRECTING IMAGE OF ROTATING INSPECTION TARGET

(71) Applicant: OLYMPUS CORPORATION, Tokyo (JP)

(72) Inventor: Eiichi Kobayashi, Tama (JP)

(73) Assignee: OLYMPUS CORPORATION, Tokyo (JP)

(*) Notice: Subject to any disclaimer, the term of this patent is extended or adjusted under 35 U.S.C. 154(b) by 185 days.

(21) Appl. No.: 15/877,472

(22) Filed: Jan. 23, 2018

(65) Prior Publication Data
US 2018/0158183 A1    Jun. 7, 2018

Related U.S. Application Data

(63) Continuation of application No. PCT/JP2016/065895, filed on May 30, 2016.

(30) Foreign Application Priority Data

Jul. 24, 2015   (JP) ................. 2015-146719

(51) Int. Cl.
*G06T 7/00*    (2017.01)
*G02B 23/24*   (2006.01)
(Continued)

(52) U.S. Cl.
CPC ......... *G06T 7/001* (2013.01); *G01N 21/84* (2013.01); *G01N 21/8851* (2013.01);
(Continued)

(58) Field of Classification Search
CPC combination set(s) only.
See application file for complete search history.

(56) References Cited

U.S. PATENT DOCUMENTS

2004/0240715 A1*  12/2004  Wicker .............. A61B 17/1757
                                                      382/128
2010/0181468 A1    7/2010  Nakamura et al.
(Continued)

FOREIGN PATENT DOCUMENTS

JP    2007-198942 A    8/2007
JP    2014-032363 A    2/2014
(Continued)

OTHER PUBLICATIONS

International Search Report dated Aug. 2, 2016 issued in PCT/JP2016/065895.

*Primary Examiner* — Alex Kok S Liew
(74) *Attorney, Agent, or Firm* — Scully, Scott, Murphy & Presser, P.C.

(57) ABSTRACT

A PC acquires a plurality of images along a rotating direction of an inspection target with a linear sensor at predetermined time intervals ΔTI, extracts position change information representing a change in an on-image position of a pixel having a predetermined feature value or a predetermined pixel value of the acquired images arranged along a time lapse, and generates information on correspondence between the position of the pixel in each of the images and an angle of rotation of the inspection target from the position change information.

7 Claims, 14 Drawing Sheets

(51) Int. Cl.
  *G01N 21/84* (2006.01)
  *G01N 21/93* (2006.01)
  *G01N 21/95* (2006.01)
  *G01N 21/954* (2006.01)
  *G06T 7/73* (2017.01)
  *G06T 7/246* (2017.01)
  *G01N 21/88* (2006.01)
  *G06T 5/00* (2006.01)
  *G06T 11/60* (2006.01)

(52) U.S. Cl.
  CPC ............ *G01N 21/93* (2013.01); *G01N 21/954* (2013.01); *G01N 21/9515* (2013.01); *G02B 23/24* (2013.01); *G06T 5/003* (2013.01); *G06T 7/248* (2017.01); *G06T 7/74* (2017.01); *G06T 11/60* (2013.01); *G01N 2021/8887* (2013.01); *G01N 2021/8893* (2013.01); *G06T 2207/10068* (2013.01); *G06T 2207/30164* (2013.01); *G06T 2207/30241* (2013.01); *G06T 2207/30252* (2013.01)

(56) References Cited

U.S. PATENT DOCUMENTS

| | | | |
|---|---|---|---|
| 2011/0025844 A1* | 2/2011 | Hori | F01D 21/003 348/135 |
| 2012/0242824 A1* | 9/2012 | Takahashi | G01B 11/0608 348/86 |
| 2013/0162846 A1 | 6/2013 | Xie et al. | |
| 2014/0253715 A1 | 9/2014 | Hori et al. | |
| 2015/0168263 A1 | 6/2015 | Mueller et al. | |

FOREIGN PATENT DOCUMENTS

| | | |
|---|---|---|
| JP | 2014-526707 A | 10/2014 |
| JP | 2014-528794 A | 10/2014 |
| JP | 2014-215395 A | 11/2014 |
| WO | WO 2007/086160 A1 | 8/2007 |
| WO | 2013/043323 A1 | 3/2013 |
| WO | WO 2013/045108 A1 | 4/2013 |

\* cited by examiner

CORRECTION INFORMATION GENERATION APPARATUS, AND CORRECTION INFORMATION GENERATION METHOD FOR CORRECTING IMAGE OF ROTATING INSPECTION TARGET

CROSS REFERENCE TO RELATED APPLICATION

This application is a continuation application of PCT/JP2016/065895 filed on May 30, 2016 and claims benefit of Japanese Application No. 2015-146719 filed in Japan on Jul. 24, 2015, the entire contents of which are incorporated herein by this reference.

BACKGROUND OF THE INVENTION

1. Field of the Invention

The present invention relates to a correction information generation apparatus, and a correction information generation method for correcting an image of a rotating inspection target, and particularly to a correction information generation apparatus used to inspect a rotating inspection target and a correction information generation method for correcting an image of a rotating inspection target.

2. Description of the Related Art

An observation scope, such as an endoscope, has been used to observe an interior of an inspection target, for example, a jet engine. An inspector can, for example, evaluate whether or not a defect of an object is present and measure a size of the defect based on an image of an interior of the object, that is, an inspection image acquired by using the observation scope inserted into the inspection target.

For example, a jet engine includes a plurality of rotor blades (hereinafter referred to as blades) as a portion to be inspected, and a casing of the engine is provided with an access port corresponding to each blade group. The inspector inserts a borescope that is an endoscope through the access port and acquires an image of the blade group observable through the access port.

When the inspector finishes acquiring an endoscope image of one group of blades periodically arranged along a circumferential direction of the rotary shaft of the jet engine by using the borescope inserted thorough the access port, the inspector rotates the rotary shaft of the rotor and acquires an endoscope image of a blade group corresponding to the following access port.

The aforementioned method for successively capturing similar endoscope images undesirably requires a long inspection time period. To solve the undesirable situation, U.S. Patent Application Publication No. 2014/0253715 proposes a method for simultaneously photographing a plurality of blade groups with a plurality of borescopes by inserting the borescopes through a plurality of access ports corresponding to the plurality of blade groups respectively and rotating a rotary shaft of an engine.

Since the proposed method allows simultaneous photographing of the plurality of blade groups, endoscope images can be efficiently acquired as compared with the method for successively photographing the respective blade groups by sequentially inserting a single borescope through each of the access ports.

SUMMARY OF THE INVENTION

A correction information generation apparatus according to an aspect of the present invention includes an image acquisition unit configured to acquire a plurality of images along a rotating direction of an inspection target at predetermined time intervals, a position change information extraction unit configured to extract position change information representing a change in an on-image position of a pixel including a predetermined feature value or a predetermined pixel value of the acquired images along a time lapse, and a correspondence information generation unit configured to generate information on correspondence between the position of the pixel in each of the images and an angle of rotation of the inspection target from the position change information.

A correction information generation method for correcting an image of a rotating inspection target according to another aspect of the present invention includes acquiring a plurality of images along a rotating direction of the inspection target at predetermined time intervals, extracting position change information representing a change in an on-image position of a pixel including the feature value or the pixel value of the acquired images along a time lapse, and generating information on correspondence between the position of the pixel in each of the images and an angle of rotation of the inspection target from the position change information.

DETAILED DESCRIPTION OF THE PREFERRED EMBODIMENT(S)

An embodiment of the present invention will be described below with reference to the drawings.

(System Configuration)

Figure 1:
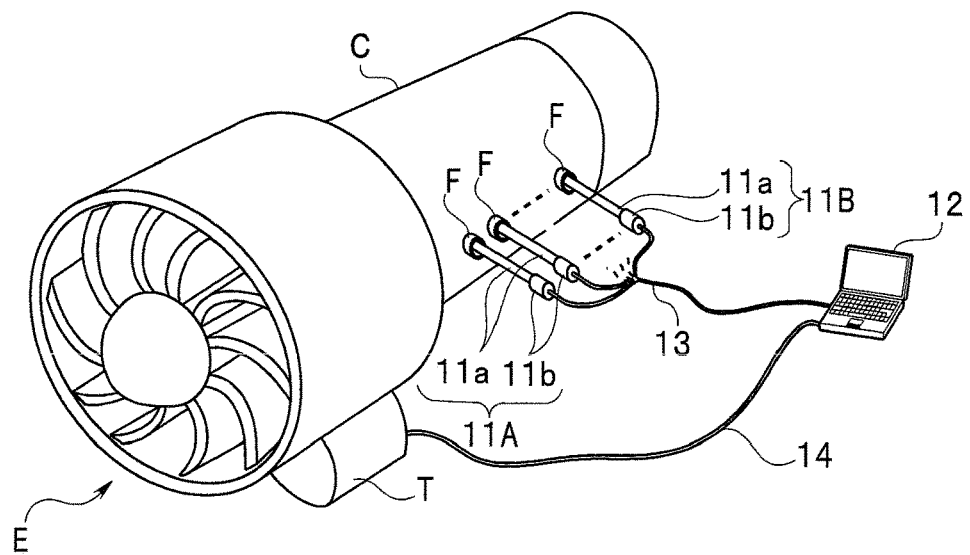
FIG. 1 is a perspective view showing how to inspect a jet engine in accordance with an embodiment of the present invention.
Figure 2:
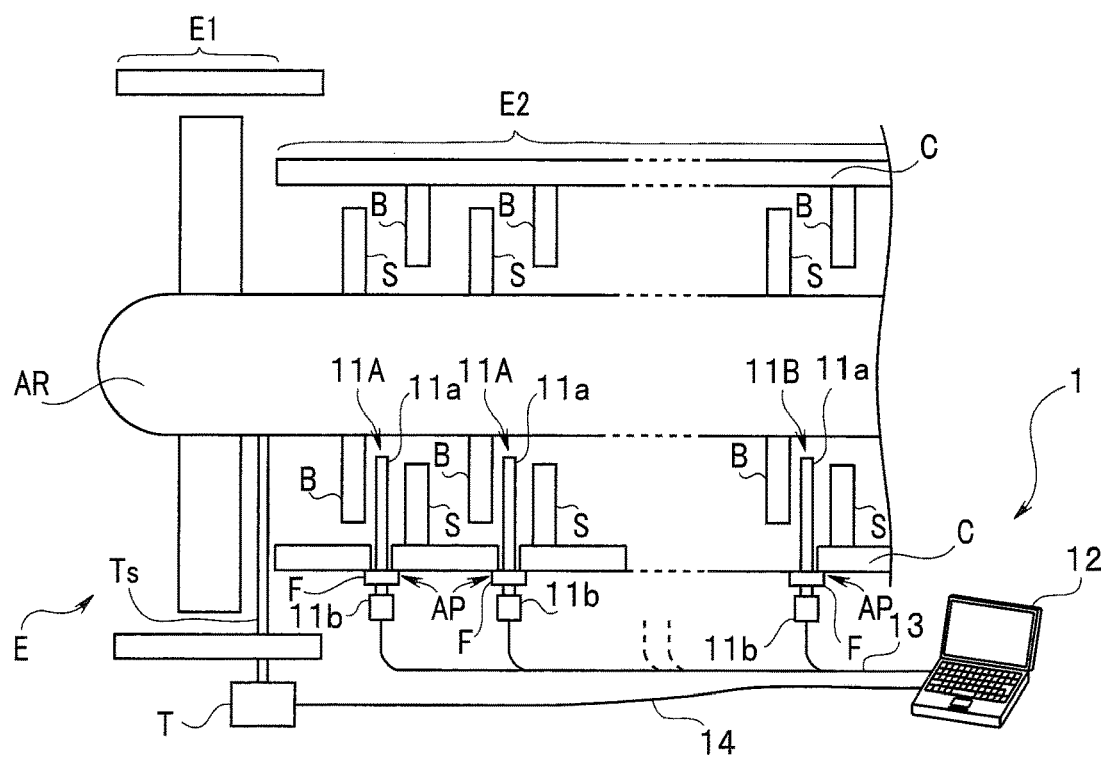
FIG. 2 is a configuration diagram showing a configuration of an endoscope system according to the present embodiment.

FIG. 1 is a perspective view showing how to inspect a jet engine (hereinafter simply referred to as engine) in accordance with the present embodiment. FIG. 2 is a configuration diagram showing a configuration of an endoscope system according to the present embodiment.

An endoscope system 1 is a blade inspection system and includes a plurality of borescopes 11A configured to acquire blade images, a single borescope 11B configured to detect an angle of rotation, and a personal computer (hereinafter referred to as PC) 12 as an inspection image generation apparatus. The plurality of borescopes 11A and 11B are connected to the PC 12 via a signal cable (hereinafter referred to as cable) 13. The borescopes 11A and 11B each include an insertion section 11a, which is inserted into an engine E, which includes a plurality of blades B, which are an inspection target, and a grasping section 11b, which is provided at a proximal end portion of the insertion section 11a.

In the present embodiment, the engine E is a jet engine and includes an intake unit E1, a compressor unit E2, a combustion unit (not shown), and an exhaust unit (not shown) arranged from an intake side toward an exhaust side. The present embodiment will be described with reference to a case where the rotor blades (hereinafter simply referred to as blades) B, which are a plurality of compressor blades in the compressor unit E2 provided behind the intake unit E1, are inspected by the endoscope system 1. Further, a turning tool T is connected to a gear box (not shown) of the engine E and configured to be capable of rotating the plurality of blades B around the rotary shaft AR.

The turning tool T is connected to the PC 12 via a cable 14, and the turning tool T is so controlled in accordance with an instruction from the PC 12 as to rotate the rotary shaft AR.

The following description will be made with reference to compressor blades. Note, however, that the blade inspection system according to the present embodiment can similarly inspect other blades, such as turbine blades.

A casing C of the engine E has a plurality of (three in the description) access ports AP in predetermined positions. The insertion section 11a of each of the borescopes 11A and 11B is an elongated rigid endoscope configured to be insertable into the casing C through a hole of the corresponding access port AP and have a diameter and a length that allow observation of a blade B.

When the insertion section 11a of each of the borescopes 11A and 11B, each of which is an endoscope, is inserted into the casing C, a fixture F is attached to the access port AP through which the insertion section 11a is inserted. The fixture F is a device for supporting and fixing the insertion section 11a of each of the borescopes 11A and 11B in the position of the access port AP of the casing C. That is, the fixture F is configured to be attachable to the access port AP, have an insertion hole through which the insertion section 11a is inserted, and support the respective borescopes 11A and 11B.

The borescopes 11A and 11B are each provided with an illumination apparatus (not shown) configured to illuminate each blade B, which is an inspection portion.

A plurality of blades are periodically arranged on an outer circumferential surface of the rotary shaft AR of the engine E along a circumferential direction. A plurality of blades around one turn that correspond to each of the access ports AP form one blade group and are the inspection target. A plurality of blade groups have different numbers of blades.

The plurality of blades B provided in each of the blade groups have the same size and shape. That is, the blade groups, which are the inspection target, each include blades B as a plurality of inspection portions having the same shape.

(Configuration of Borescope)

Figure 3:
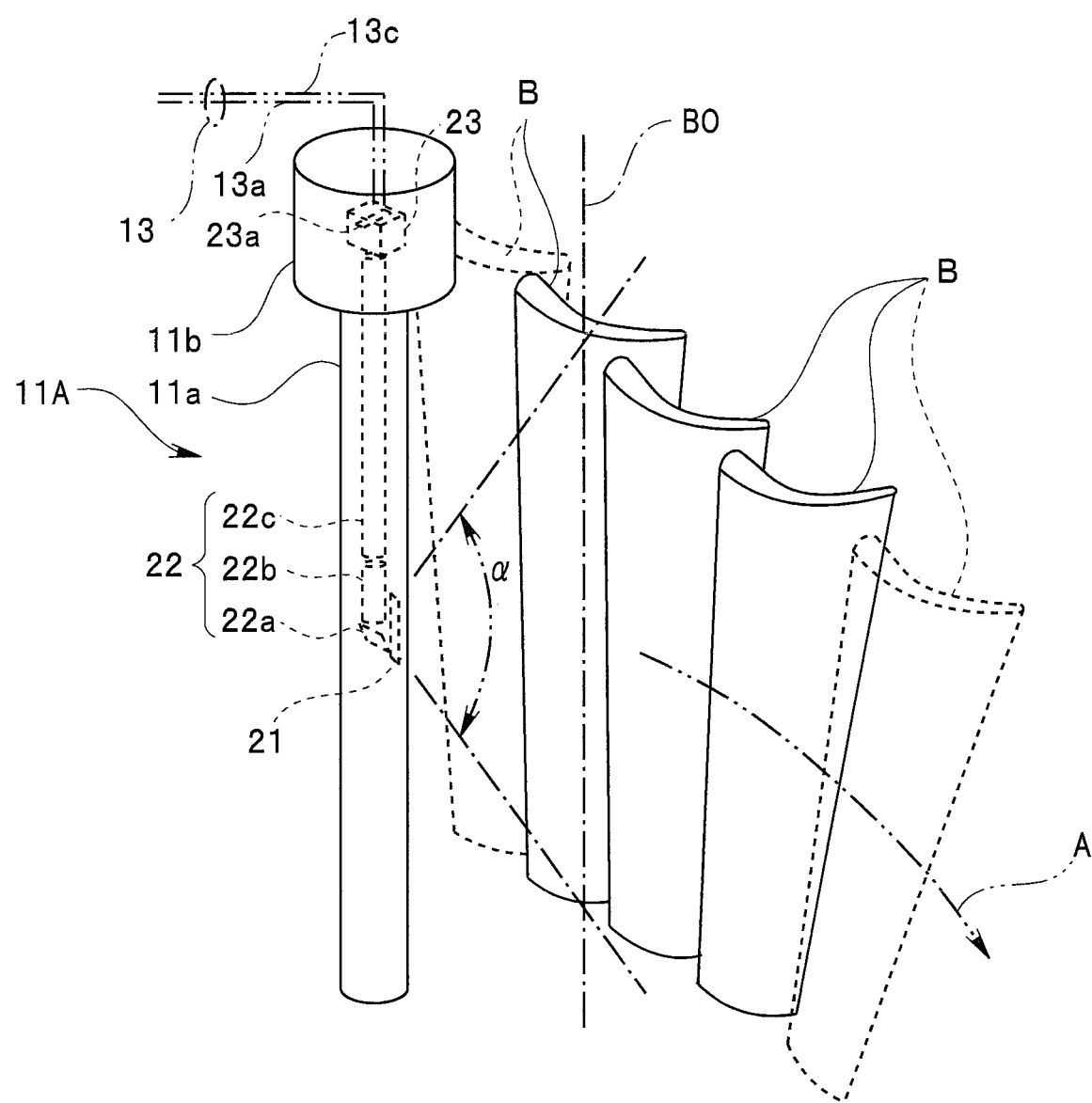
FIG. 3 describes a configuration of a borescope 11A and an image pickup area of the borescope 11A according to the embodiment of the present invention.

FIG. 3 describes a configuration of each of the borescopes 11A and an image pickup area of the borescope 11A.

The borescopes 11A are each a side-viewing endoscope. The insertion section 11a of each of the borescopes 11A is provided with an observation window 21.

In correspondence with the observation window 21, an optical member 22, which includes a mirror 22a, an objective optical system 22b, and a relay optical system 22c, is disposed in the insertion section 11a. The mirror 22a is so disposed behind the observation window 21 as to reflect light incident through the observation window 21 and guide the light to the relay optical system 22c via the objective optical system 22b.

The grasping section 11b is provided with a camera unit 23. The camera unit 23 includes an image pickup optical system (not shown) configured to focus light from an object image and a linear sensor 23a, which is a solid-state image pickup device configured to convert an optical object image formed by the light focused by the image pickup optical system into an electrical object image.

The linear sensor 23a in the camera unit 23 is so arranged as to acquire a one-dimensional image along a direction roughly parallel to an axis B0 of the blades B. The camera unit 23 acquires an image having a viewing angle α containing an entirety of a blade B along a direction roughly parallel to a longitudinal axis of the blades B (that is, direction of axis B0).

A signal line 13a, which extends from the camera unit 23, passes through the cable 13 and is connected to the PC 12.

Figure 4:
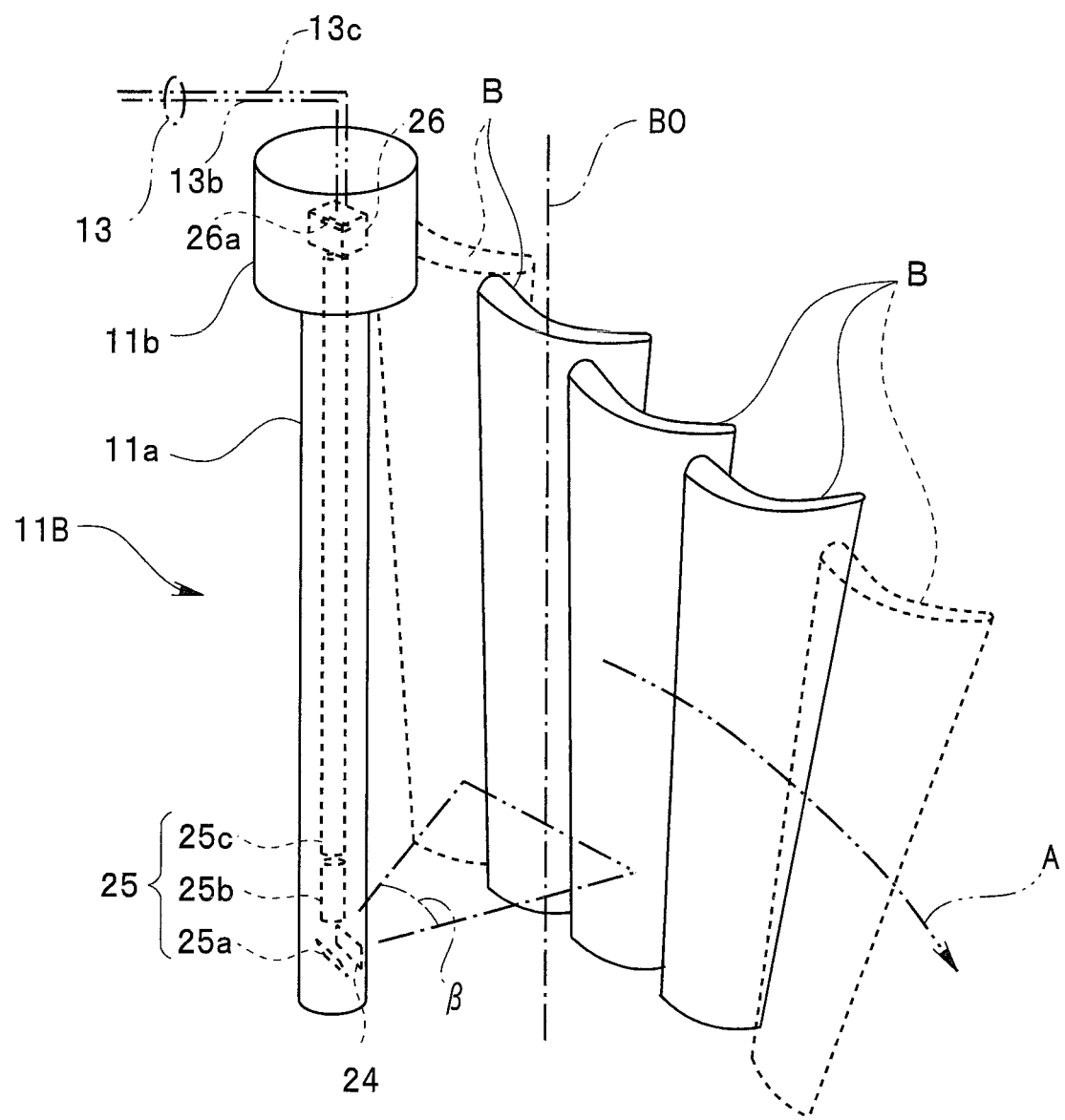
FIG. 4 describes a configuration of a borescope 11B and an image pickup area of the borescope 11B according to the embodiment of the present invention.

FIG. 4 describes a configuration of the borescope 11B and an image pickup area of the borescope 11B.

The borescope 11B is a side-viewing endoscope. The insertion section 11a is provided with an observation window 24.

In correspondence with the observation window 24, an optical member 25, which includes a mirror 25a, an objective optical system 25b, and a relay optical system 25c, is disposed in the insertion section 11a. The mirror 25a is so disposed behind the observation window 24 as to reflect light incident through the observation window 24 and guide the light to the relay optical system 25c via the objective optical system 25b.

The grasping section 11b is provided with a camera unit 26. The camera unit 26 includes an image pickup optical system (not shown) configured to focus light from an object image and a linear sensor 26a, which is a solid-state image pickup device configured to convert an optical object image formed by the light focused by the image pickup optical system into an electrical object image.

The linear sensor 26a in the camera unit 26 is so arranged as to acquire a one-dimensional image along a direction roughly perpendicular to the axis B0 of the blades B. The camera unit 26 acquires an image having a viewing angle β containing a width of at least one blade B along a direction roughly perpendicular to a longitudinal axis of the blades B (that is, direction of axis B0).

The borescope 11B is arranged in a position where parts of two blades B adjacent to each other overlap and the overlapping portion is photographed so that an edge portion BE of each of the blades B can be photographed. That is, the camera unit 26 acquires an image having the viewing angle β always containing the edge portion BE of a blade B along the direction roughly perpendicular to the longitudinal axis of the blades B (that is, direction of axis B0).

A signal line 13b, which extends from the camera unit 26, passes through the cable 13 and is connected to the PC 12.

An image pickup signal that is a video signal produced by each of the camera units 23 and 26 is outputted to the PC 12 via the cable 13.

Note that the camera units 23 and 26 each continuously acquire and output images in a predetermined cycle ΔTI, which is sufficiently faster than a moving speed of the blades B.

The camera unit 23 therefore forms an image acquisition unit configured to pick up image of the blade group, which is a rotatable inspection target, with the borescope 11A, which is inserted into the engine E, in the cycle TI, which is a predetermined time interval, to acquire a plurality of inspection target images of the blades B with the linear sensor 23a, which extends along a direction roughly perpendicular to a rotating direction of the blade group (that is, direction of axis B0).

The camera unit 26 folios an image acquisition unit configured to pick up image of a blade group with the borescope 11B at the same time intervals (cycle ΔTI) in synchronization with acquisition timing of the inspection target images acquired with the linear sensors 23a to acquire a plurality of inspection target images of the blades B with the linear sensor 26a, which extends along the rotating direction of the blade group.

Further, in the description, the light that originates from an object and is acquired through the observation windows 21 and 24 is guided to the camera units 23 and 26, which are provided in the grasping sections 11b, via the optical members, such as the mirrors 22a and 25a provided in the insertion sections 11a, respectively. The linear sensors 23a and 26a may instead be arranged along with the respective objective optical systems behind the observation windows 21 and 24 to acquire images of the blades B.

Figure 5:
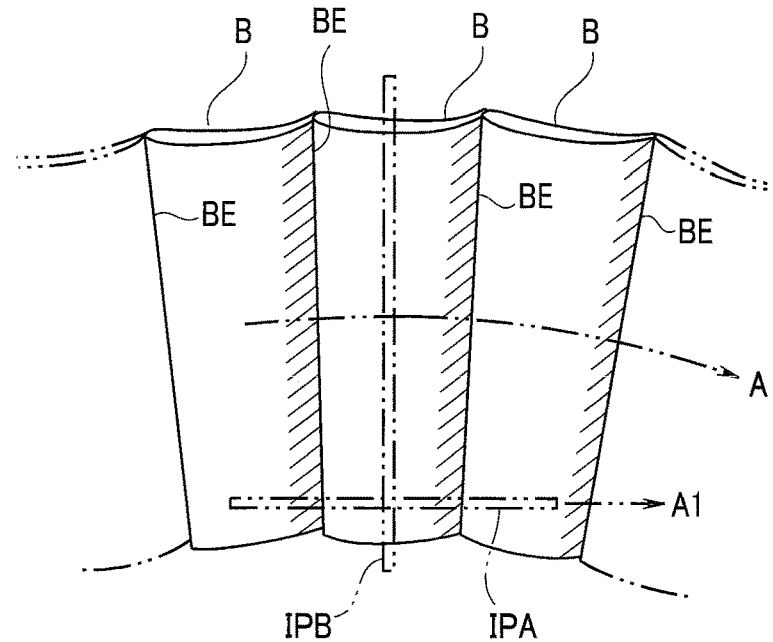
FIG. 5 shows an image acquisition area IPA, where a linear sensor 26a in a camera unit 26 in the borescope 11B acquires an image of blades B according to the embodiment of the present invention.

FIG. 5 shows an image acquisition area IPA, where the linear sensor 26a in the camera unit 26 in the borescope 11B acquires an image of blades B.

The linear sensor 26a in the camera unit 26 acquires a one-dimensional image along the direction roughly perpendicular to the axis B0 of the blades B, as described above, and the image acquisition area IPA relating to the camera unit 26 is a one-dimensional area, and a direction of a one-dimensional line of the image acquisition area IPA is roughly parallel to a moving direction A1 of the blades B, which is indicated by the arrow A, as shown in FIG. 5.

That is, the linear sensor 23a in the camera unit 23 in each of the borescopes 11A acquires a one-dimensional image along the axis B0 of the blades B, and an image acquisition area IPB relating to the camera unit 26 in the borescope 11B is a one-dimensional area, and the direction of the one-dimensional line of the image acquisition area IPB is roughly parallel to the moving direction A1 of the respective blades B, which is indicated by the arrow A, as shown in FIG. 5.

In a linear image IPAi of the image acquisition area IPA, part of a blade B or a portion close to the observation window 24 forms high-luminance-value pixels, and part of the blade B or a portion far from the observation window 24 forms low-luminance-value pixels, as shown in FIGS. 4 and 5. A portion where a difference in the luminance value between two pixels adjacent to each other is greater than or equal to a predetermined value corresponds to the edge portion BE of a blade B.

To ensure continuity of the rotation of the plurality of blades B, during the period for which the rotating blade groups are photographed, the image acquisition area IPA is set to be an area or a range containing at least one edge portion of the blades.

Therefore, when the blade groups rotate in the direction indicated by the arrow A, the camera units 23 each output linear images Bi according to the rotation and along the direction of the axis B0 of each of the blades B, and the PC 12 can produce a two-dimensional image of the blade B from the received linear images Bi.

Further, when the blade groups rotate in the direction indicated by the arrow A, the camera unit 26 outputs linear images IPAi according to the rotation and each containing information on a position of the edge portion of each of the blades B, and the PC 12 can produce a rotation angle information image (which will be described later) of the blade B from the received linear images IPAi.

Note that, in the description, the borescopes 11A and 11B differ from each other in terms of the positions of the observation windows 21 and 24, the optical members 22 and 25, and other factors, but the borescope 11B may have roughly the same configuration as the configuration of the borescopes 11A but differ from the borescopes 11A only in that the orientation of the linear sensor 26a differs from the orientation of the linear sensors 23a.

(Configuration of PC)

Figure 6:
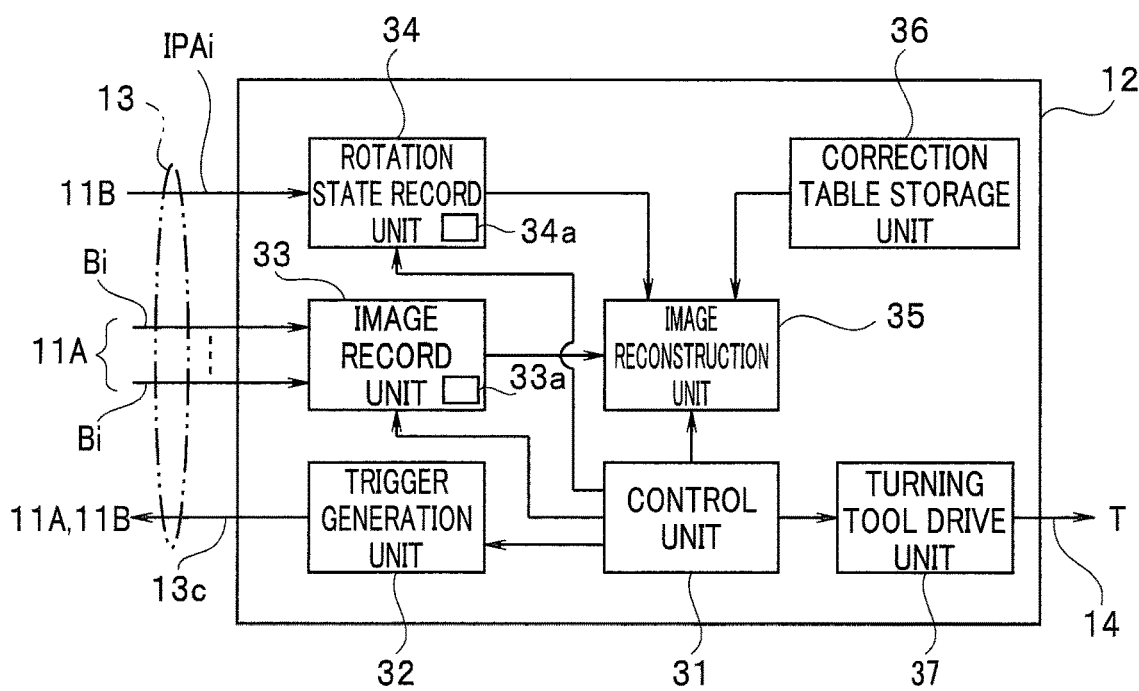
FIG. 6 is a block diagram showing a configuration of a PC 12 according to the embodiment of the present invention.

FIG. 6 is a block diagram showing a configuration of the PC 12. The PC 12 is configured to include a control unit 31, a trigger generation unit 32, an image record unit 33, a rotation state record unit 34, an image reconstruction unit 35, a correction table storage unit 36, and a turning tool drive unit 37.

The control unit 31 includes a central processing unit (hereinafter referred to as CPU), a ROM, and a RAM and executes a variety of programs stored in the ROM. The variety of programs include an inspection process program, which will be described later.

The trigger generation unit 32 is a circuit configured to generate a trigger signal for simultaneous photographing performed by the plurality of borescopes 11A and 11B and supply the plurality of borescopes 11A and 11B via a signal line 13c accommodated in the cable 13 under control of the control unit 31.

The image record unit 33 is a circuit configured to receive an image signal from each of the plurality of borescopes 11A and record the image signal in an internal storage unit 33a under the control of the control unit 31.

The rotation state record unit 34 is a circuit configured to receive an image signal from the borescope 11B, produce a rotation angle information image RS (which will be described later) showing the angle of rotation of the rotary shaft AR, and record the rotation angle information image RS in an internal storage unit 34a under the control of the control unit 31.

The image reconstruction unit 35 is a circuit configured to carry out a process of reconstructing the image signals supplied from the plurality of borescopes 11A and recorded in the image record unit 33 based on the rotation angle information image RS recorded in the rotation state record unit 34 and a correction table CT, which will be described later, under the control of the control unit 31.

The correction table storage unit 36 stores the correction table CT, which will be described later. The correction table CT stores correspondence information representing correspondence between a position of a pixel of an edge portion BE on a linear image produced by the borescope 11B and the angle of rotation of the rotary shaft AR.

The turning tool drive unit 37 is a circuit configured to output a drive signal to the turning tool T via the cable 14 to rotate the rotary shaft AR under the control of the control unit 31.

(Operation)

A process of inspecting the blades B will next be described.

Figure 7:
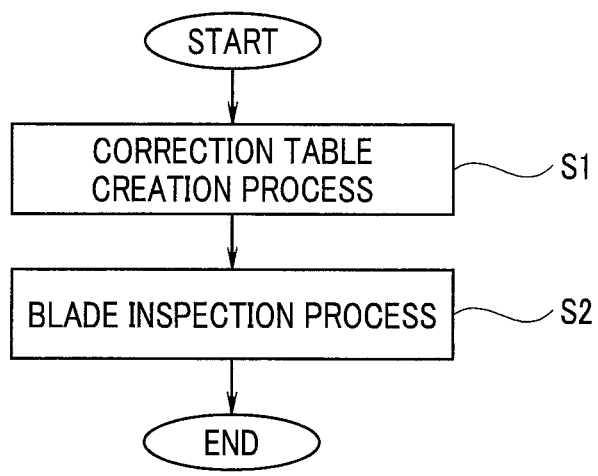
FIG. 7 is a flowchart showing an example of a procedure of a blade inspection process carried out by a control unit 31 of the PC 12 according to the embodiment of the present invention.

FIG. 7 is a flowchart showing an example of a procedure of the blade inspection process carried out by the control unit 31 of the PC 12.

A user who is an inspector inserts borescopes 11A through a respective plurality of the access ports AP corresponding to a plurality of blade groups that the user desires to inspect out of the plurality of blade groups in the engine E and fixes the borescopes 11A in predetermined positions where an image of each of the blades B of each of the blade groups. For example, the borescopes 11A are each so inserted and fixed in a position and at an orientation that prevent adjacent blades B from overlap with each other but allow the entire shape of each of the blades B to be photographed.

The user further inserts the borescope 11B through one of the plurality of access ports AP and fixes the borescope 11B in a predetermined position where an image of the image acquisition area IPA described above can be acquired. The image acquisition area IPA is set to be an area or a range that always contains at least one edge portion BE of the blades B so that the continuity of the rotation of each of the blade groups can be ensured, as described above.

When the user inputs a predetermined command to the PC 12, the control unit 31 of the PC 12 reads and executes an inspection process program corresponding to a command inputted from the ROM to carry out the blade inspection process in FIG. 7.

The control unit 31 carries out a correction table creation process (S1) and carries out the blade inspection process (S2) after the correction table creation process, as shown in FIG. 7.

Before a description of the process in S1, the image produced by the borescope 11B will be described.

Figure 8:
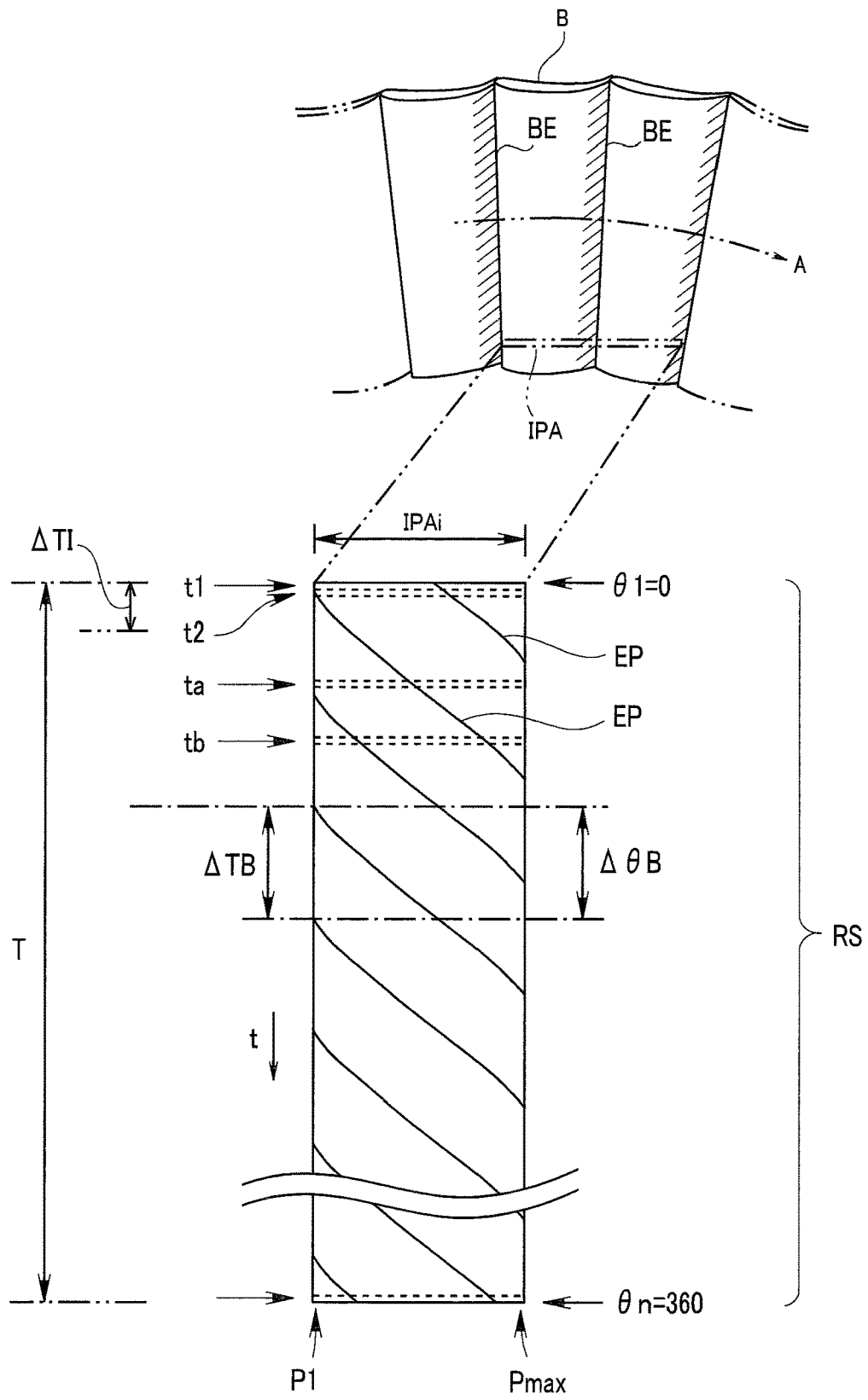
FIG. 8 describes a change in a linear image IPAi of the image acquisition area IPA as time elapses according to the embodiment of the present invention.

FIG. 8 describes a change in the linear image IPAi of the image acquisition area IPA as time elapses. Part of a blade group is shown in an upper portion of FIG. 8, and the rotation angle information image RS produced from the linear image IPAi, which is an image of the image acquisition area IPA and produced by the borescope 11B, is shown in a lower portion of FIG. 8.

A vertical axis of the rotation angle information image RS in FIG. 8 corresponds to time t that elapses from above to below, and a horizontal axis of the rotation angle information image RS corresponds to a position of each pixel of the linear image IPAi. In the description, the linear image IPAi has a plurality of pixels from a leftmost pixel P1 to a rightmost pixel Pmax.

The rotation angle information image RS shows a change in an edge position of the edge portion BE contained in the linear image IPAi for a time period T, in which the rotary shaft AR of the engine E makes one turn. Specifically, the edge position of the edge portion BE is indicated by a pixel EP as an edge pixel. The pixel EP, which is the edge pixel corresponding to the edge portion BE, can be determined, for example, by comparing pixel values of two pixels adjacent to each other and evaluating whether or not a difference between the pixel values is greater than or equal to a predetermined value.

That is, the linear image IPAi in the rotation angle information image RS is replaced with pixel information representing a position of the pixel EP of a detected edge portion BE, and the rotation state record unit 34 described above superimposes linear images IPAi each containing the pixel EP of the edge portion BE on one another along a direction of a temporal axis representing the time t to produce the rotation angle information image RS shown in FIG. 8 and records the rotation angle information image RS in the storage unit 34a.

The borescope 11B is so set up that the linear image IPAi always contains the pixel EP corresponding to at least one edge portion BE, as described above. Further, the camera units 23 and 26 each continuously acquire images in the cycle ΔTI, which is sufficiently faster than the moving speed of the blades B. When the blade groups rotate in the rotation direction indicated by the arrow A in FIG. 5, the position of the pixel EP of the edge portion BE on the linear image IPAi changes as the time t elapses, as shown in FIG. 8.

In FIG. 8, the pixel EP of the edge portion BE at time t1 moves rightward at time t2. The number of pixels EP of the edge portion BE is one at the time t1, and the following pixel EP of the edge portion BE is added at the time t2. In FIG. 8, one pixel EP of the edge portion BE is present on the linear image IPAi at time ta, and two pixels EP of the edge portions BE are present on the linear image IPAi at time tb.

That is, the position of the pixel EP corresponding to the edge portion BE in the image acquisition area IPA moves in accordance with the rotation of the rotary shaft AR, as indicated by solid lines in FIG. 8.

Let T be a time period required for the rotary shaft AR to make one turn and N be the number of blades B contained in a blade group, and a cycle ΔTB, which is the cycle in which a blade image of a blade B contained in the blade group appears, is expressed by equation (1) below:

$$\Delta TB = T/N \tag{1}$$

The cycle in which the edge portion BE of the blade B appears is therefore also ΔTB. An angular change ΔθB of the rotary shaft AR corresponding to ΔTB is expressed by equation (2) below:

$$\Delta\theta B = 360 \text{ (degrees)}/N \tag{2}$$

Since the position of the edge portion BE corresponds to a rotation angle position of the rotary shaft AR, the position of the pixel EP corresponding to the edge portion BE on the linear image IPAi also corresponds to the rotation angle position of the rotary shaft AR.

Figure 9:
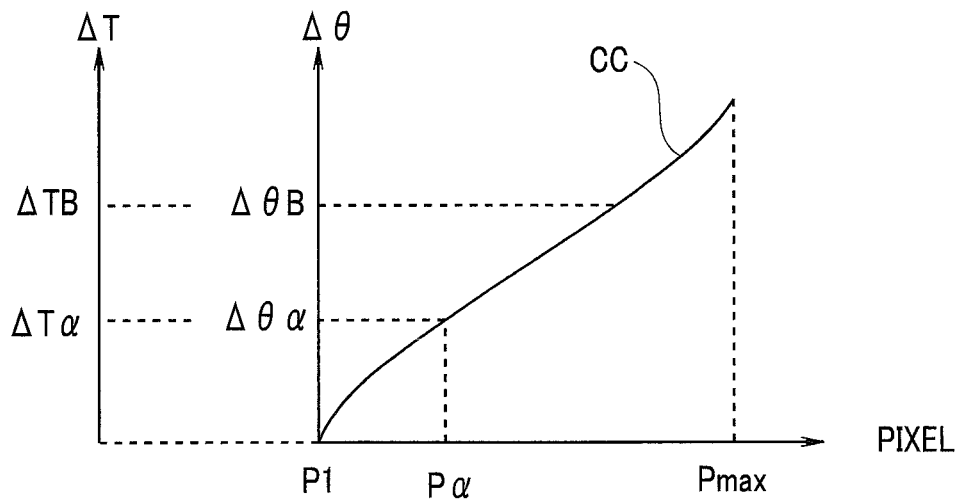
FIG. 9 shows a correction curve CC representing correspondence between a position of a pixel EP of an edge portion BE on the linear image IPAi and an amount of angular change $\Delta\theta$ of an angle of rotation of a rotary shaft AR according to the embodiment of the present invention.

FIG. 9 shows a correction curve CC showing correspondence between the position of the pixel EP of the edge portion BE on the linear image IPAi and an amount of angular change Δθ in the angle of rotation of the rotary shaft AR. A horizontal axis of FIG. 9 corresponds to the position of the pixel EP of the edge portion BE on the linear image IPAi, and a vertical axis of FIG. 9 corresponds to the amount of angular change Δθ in the angle of rotation of the rotary shaft AR. Information on the correction curve CC is stored as the correction table CT in the correction table storage unit 36. Note that the correction table CT is created in the inspection process, as will be described later.

The correction curve CC shown in FIG. 9 is determined by aberrations produced by the optical system including the observation window 24 and the optical member 25 in the borescope 11B, an angle of the one-dimensional line of the image acquisition area IPA with respect to the moving direction of the blades B, and other factors.

When the position of the pixel EP of the edge portion BE moves from the position of the pixel P1 to the position of the pixel Pmax as the time t elapses in accordance with the rotation of the rotary shaft AR, the amount of angular change Δθ around the rotary shaft AR between edge portions BE adjacent to each other is ΔθB described above, as shown in FIG. 9. Further, the cycle in which the edge portion BE appears is ΔTB, as described above.

Therefore, counting the cycle (number of cycles) in which the pixel EP on the linear image IPAi appears in the same position or the number by which the pixel EP on the linear image IPAi appears in the same position after the first time t1 and calculating an amount of angular change Δθα based on the position of the pixel EP on the linear image IPAi in each cycle allow determination of the angle of rotation θ of the rotary shaft AR from the time t1 during the rotation of the rotary shaft AR.

For example, let M be the number of appearances of the pixel EP and Δθα be the amount of angular change in a next cycle ΔTB, and the angle of rotation θ of the rotary shaft AR from the time t1 is expressed by equation (3) below:

$$\theta = \Delta\theta B \times M + \Delta\theta\alpha \tag{3}$$

Further, a time period Tt having elapsed since the time t1 relating to the rotary shaft AR is expressed by equation (4) below:

$$Tt = \Delta TB \times M + \Delta T\alpha \tag{4}$$

Here, ΔTα represents an amount of temporal change in the cycle ΔTB.

As described above, the angle of rotation θ and the elapsed time period Tt from the start of the rotation of the rotary shaft AR can be calculated from information on the position of the pixel EP on the linear image IPAi.

However, the rotation of the rotary shaft AR contains rotation unevenness due, for example, to backlash of the gear box, as described above. Therefore, although not shown in FIG. 8, the movement of the position of the pixel EP located on the linear image IPAi and corresponding to the edge portion BE contains unevenness in accordance with the rotation unevenness of the rotary shaft AR, and the photographing range of the blade B contained in a resultant linear image IPAi therefore does not correspond to the angle of rotation of the rotary shaft AR.

To address the problem described above, the correction table, which is a correspondence table that relates the position of each pixel EP of the edge portion BE on the linear image IPAi to the angle of rotation around the rotary shaft AR, is created from a plurality of linear images IPAi produced by continuously photographing the rotary shaft AR rotated at a constant speed by using the turning tool T (S1). The correspondence table is used to reconstruct image signals from the plurality of borescopes 11A for generation of rotation-unevenness-free image signals from rotation-unevenness-containing image signals. The correspondence table is used to rearrange, delete, or otherwise correct blade images recorded in the image record unit 33 at the time of the reconstruction, and the correspondence table is therefore hereinafter referred to as the correction table.

(Correction Table Creation Process)

Figure 10:
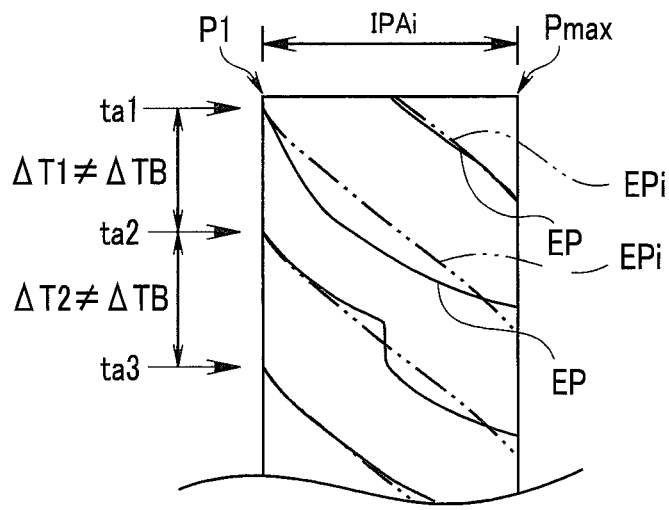
FIG. 10 describes rotation unevenness of the rotary shaft AR in a rotation angle information image RS according to the embodiment of the present invention.

FIG. 10 describes the rotation unevenness of the rotary shaft AR in the rotation angle information image RS. In a case where no rotation unevenness of the rotary shaft AR is present, the position of the pixel EP corresponding to the edge portion BE contained in the linear image IPAi changes along curves EPi indicated by two-dot chain lines in FIG. 10 in the rotation angle information image RS. In contrast, in the case where the rotation unevenness of the rotary shaft AR is present, the position of the pixel EP corresponding to the edge portion BE contained in the linear image IPAi changes, for example, as indicated by solid lines in FIG. 10.

FIG. 8 shows the rotation angle information image RS in the case where no rotation unevenness of the rotary shaft AR is present, and in the case where no rotation unevenness of the rotary shaft AR is present, the cycle in which the edge portion BE of a blade B appears is ΔTB described above, which is a constant cycle, as described above. However, since the rotation of the rotary shaft AR contains rotation unevenness, a cycle ΔT1 between time ta1 and ta2 during which the edge portion BE at the pixel P1 appears and a cycle ΔT2 between time ta2 and ta3 during which the edge portion BE at the pixel P1 appears do not coincide with the cycle ΔTB, as shown in FIG. 10.

In the case where the rotation unevenness shown in FIG. 10 is present, images of the blade groups produced by the borescopes 11A are each entirely or partially expanded or shrunk along the rotating direction of the blades B, so that resultant images of the plurality of blades B received by the image record unit 33 are not correctly produced.

To address the problem described above, in the present embodiment, the correction table CT and the rotation-unevenness-containing rotation angle information image RS are used to correct and reconstruct blade images produced by the borescopes 11A. The correction table CT is created in S1 shown in FIG. 7. The correction table CT, which is the correspondence information representing the correspondence between the position of the pixel of the edge portion BE on the linear image IPAi and the angle of rotation of the rotary shaft AR, is created based on the linear images IPAi produced by actually rotating the inspection target.

Figure 11:
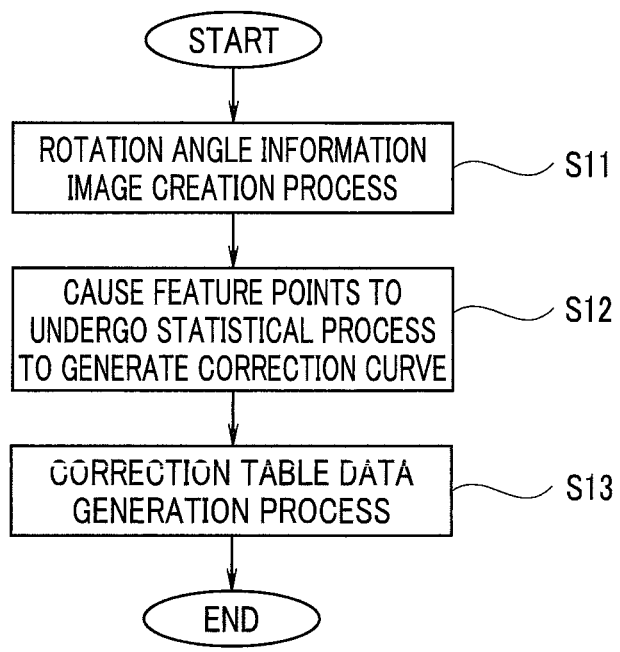
FIG. 11 is a flowchart showing an example of a procedure of a correction table creation process according to the embodiment of the present invention.

FIG. 11 is a flowchart showing an example of a procedure of a correction table creation process.

The control unit 31 first carries out a rotation angle information image creation process of controlling the turning tool drive unit 37 to drive the turning tool T to rotate the rotary shaft AR at a constant speed, acquiring linear images IPAi of the image acquisition area IPA from the borescope 11B in the cycle ΔTI, creating the rotation angle information image RS, and recording the rotation angle information image RS in the storage unit 34a (S11).

In S11, the rotation angle information image RS formed by stacking the linear images IPAi shown in FIG. 10 is produced. The rotation angle information image RS is an image containing information on the rotation unevenness, that is, rotation angle unevenness of the rotary shaft AR. In the rotation angle information image creation process, for example, the rotary shaft AR is rotated for a predetermined time period, so that a plurality of curves representing a trajectory of the pixel EP corresponding to the edge portion BE are produced.

The control unit 31 then causes the points of the pixel EP of the edge portion BE, which is a predetermined feature point, contained in the rotation angle information image RS to undergo a predetermined statistical process to generate a correction curve CL (S12).

The control unit 31 superimposes the trajectories of the pixel EP in the rotation angle information image RS on one another in such a way that positions of a predetermined pixel coincide with one another to generate an image of the superimposed trajectories. The control unit 31 then calculates and determines an average point, for example, a point where a largest number of trajectories are superimposed on one another, out of the points of the pixel EP, which is the predetermined feature point, and generates the correction curve CL from the determined point.

Figure 12:
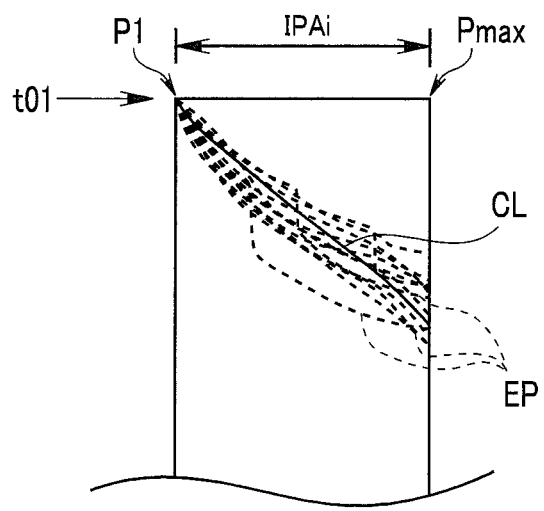
FIG. 12 shows a correction curve CL obtained by determining a point where a plurality of curves formed of points of the pixel EP, which is a predetermined feature point, are superimposed on one another by a largest number and creating a trajectory of the determined point according to the embodiment of the present invention.

FIG. 12 shows the correction curve CL obtained by determining a point where a plurality of curves formed of the points of the pixel EP, which is the predetermined feature point, are superimposed on one another by the largest number and creating a trajectory of the determined point.

As shown in FIG. 12, a trajectory of the point where the plurality of curves (indicated by dotted lines) representing the trajectory of the pixel EP with the positions of the pixel P1 coinciding with one another are superimposed on one another by the largest number is determined as the correction curve CL in the statistical process in S12.

As described above, the superimposed image generated in S12 is an image obtained by superimposing the trajectories of the pixel EP on one another in such a way that the positions of the predetermined pixel (P1), where a feature value of the linear image IPAi is present, coincide with one another, and the feature value is a feature value representing an edge of the linear image IPAi.

The correction curve CL is a curve obtained by inverting the correction curve CC shown in FIG. 9, which represents the correspondence between the position of the pixel EP of the edge portion BE on the linear image IPAi and the amount of angular change Δθ in the angle of rotation of the rotary shaft AR, with the orientation of the temporal axis reversed, and the correction curve CL is position change information representing a change in the position of the pixel EP on the linear image IPAi.

The control unit 31 generates correction table data in the correction table CT shown in FIG. 10 from the correction curve CL determined in S12 and carries out a process of generating the correction table data to be stored in the correction table storage unit 36 (S13).

As described above, the rotary shaft AR of the engine E is rotated at a constant speed by using the turning tool T, a plurality of rotation-unevenness-containing curves representing the trajectory of the pixel EP are acquired and recorded, the correction curve CL in a constant speed rotation state is estimated from a trajectory obtained by averaging the recorded curves representing the trajectory of the pixel EP, and the correction table data is generated from the correction curve CL.

Note that, in FIG. 12, a position of ΔTB in FIG. 9 is set in a position of an average of the points of time when the pixel EP of a next edge portion BE appears in the position of the pixel P1 on the trajectory of the pixel EP during a period for which the trajectory of the pixel EP that starts from the pixel P1 moves from the pixels P1 to Pmax of the linear image IPAi.

Note that the correction table data may instead be determined by dividing a range of the linear image IPAi into a plurality of areas, determining a trajectory of a point where the superimposition occurs by a largest number for each of the divided areas, and connecting the plurality of determined trajectories to each other.

Figure 13:
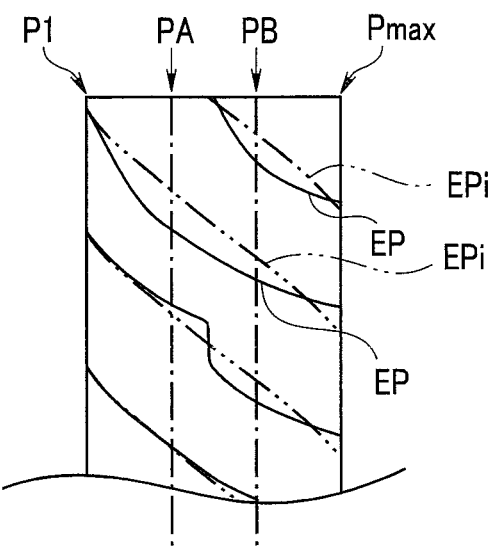
FIG. 13 shows a state in which a range of the linear image IPAi is divided into a plurality of areas according to the embodiment of the present invention.

FIG. 13 shows a state in which the range of the linear image IPAi is divided into a plurality of areas. The image acquisition area IPA is divided at two positions, pixels PA and PB, into three areas, as shown in FIG. 13. A trajectory where the superimposition occurs by a largest number is determined for each of the divided areas. Note that, in the description, the image acquisition area IPA is divided into the three areas but may instead be divided into two areas or four or more areas.

Figure 14:
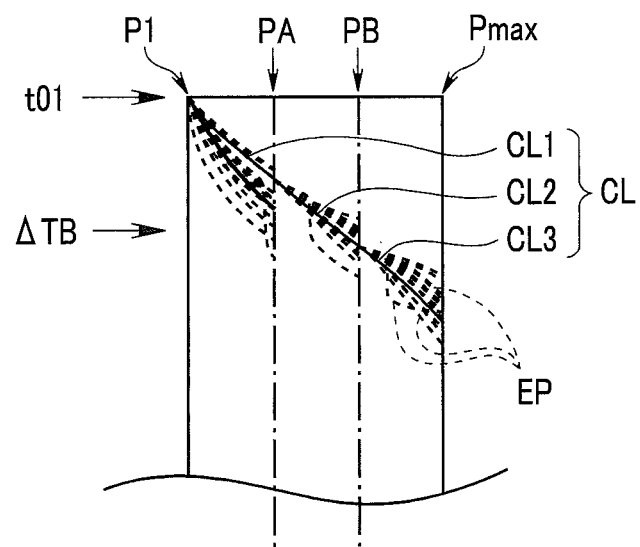
FIG. 14 describes a method for determining a trajectory of an average point, for example, a point where a plurality of curves each representing a trajectory of the pixel EP are superimposed on one another by a largest number for each of the divided areas according to the embodiment of the present invention.

FIG. 14 describes a method for determining a trajectory of an average point, for example, a point where a plurality of curves each representing the trajectory of the pixel EP are superimposed on one another by a largest number for each of the divided areas.

In a first area (range from pixels P1 to (PA−1)), a trajectory CL1 of a point where a plurality of curves (indicated by dotted lines) with positions of the pixel P1 coinciding with are superimposed on one another by a largest number is determined in a statistical process, as shown in FIG. 14. In a second area (range from pixels PA to (PB−1)), a trajectory CL2 of a point where a plurality of curves (indicated by dotted lines) with positions of the pixel PA coinciding with one another are superimposed on one another by a largest number is determined in the statistical process. In a third area (range from pixels PB to Pmax), a trajectory CL3 of a point where a plurality of curves (indicated by dotted lines) with positions of the pixel PB coinciding with one another are superimposed on one another by a largest number is determined in the statistical process.

The correction curve CL is determined by connecting end points of the three trajectories CL1, CL2, and CL3 determined in the respective areas to each other in such a way that the three trajectories CL1, CL2, and CL3 are continuous with each other. The correction table data is generated from the correction curve CL generated by connecting the three trajectories CL1, CL2, and CL3 to each other (S13).

Note that, also in FIG. 14, the position of ΔTB in FIG. 9 is set in the position of the average of the points of time when the pixel EP of a next edge portion BE appears in the position of the pixel P1 on the trajectory of the pixel EP during the period for which the trajectory of the pixel EP that starts from the pixel P1 moves from the pixels P1 to Pmax of the linear image IPAi.

The correction table data in the correction table CT stored in the correction table storage unit 36 is thus generated.

Note that, as a variation of the method for generating the correction table data, the statistical process described above is not carrying out, but image data on linear images IPAi containing no pixel EP may be superimposed on one another in every cycle ΔTB, and the correction curve CL may be determined from a distribution of luminance in positions of respective pixels of the superimposed image.

Figure 15:
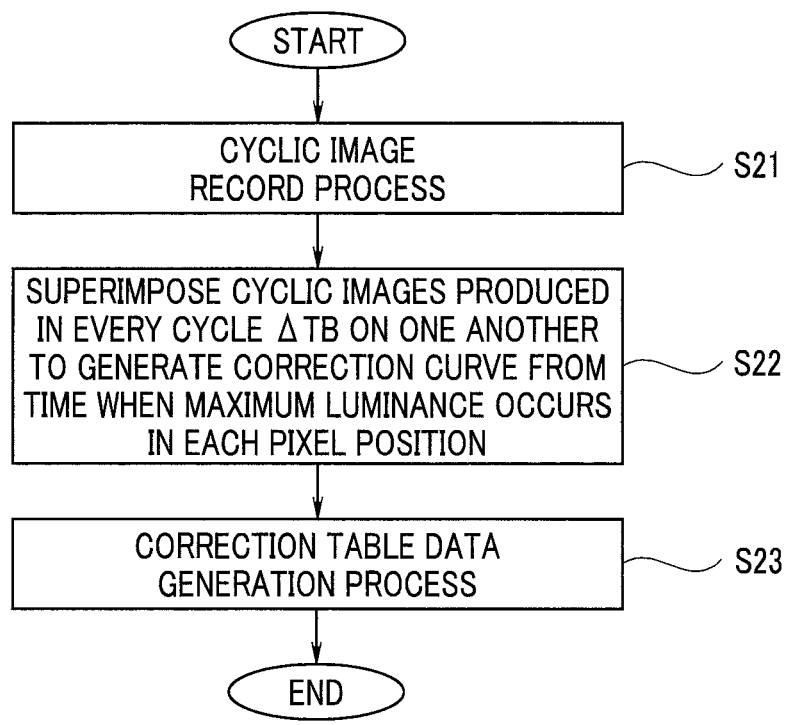
FIG. 15 is a flowchart showing an example of a procedure of a process of creating a correction table CT according to a modification of the embodiment of the present invention.

FIG. 15 is a flowchart showing an example of the procedure of the process of creating the correction table CT according to a modification.

The control unit 31 first carries out a cyclic image record process of controlling the turning tool drive unit 37 to drive the turning tool T to rotate the rotary shaft AR at a constant speed, acquiring a linear image IPAi of the image acquisition area IPA from the borescope 11B in every cycle ΔTI, and recording a cyclic image in every predetermined cycle ΔTB (S21). The cyclic image recorded in every cycle ΔTB is an image that contains image data in a range of the cycle ΔTB and has a range wider than the range of the cycle ΔTB. The predetermined cycle ΔTB can be determined by equation (1) described above.

The control unit 31 then separates the cyclic images each produced in every predetermined cycle ΔTB from one another along the time t at intervals of the predetermined cycle ΔTB and superimposes the plurality of separated cyclic images each separated in every cycle ΔTB on one another to generate a correction curve CL from time when maximum luminance occurs in each pixel position (S22). That is, the superimposed image is an image obtained by superimposing a plurality of pixel value images extracted in every predetermined cycle ΔTB on one another. It can also be said that the correction curve CL generated from the time when the maximum luminance occurs in each pixel position is a curve generated from an average time when the pixel EP appears.

Figure 16:
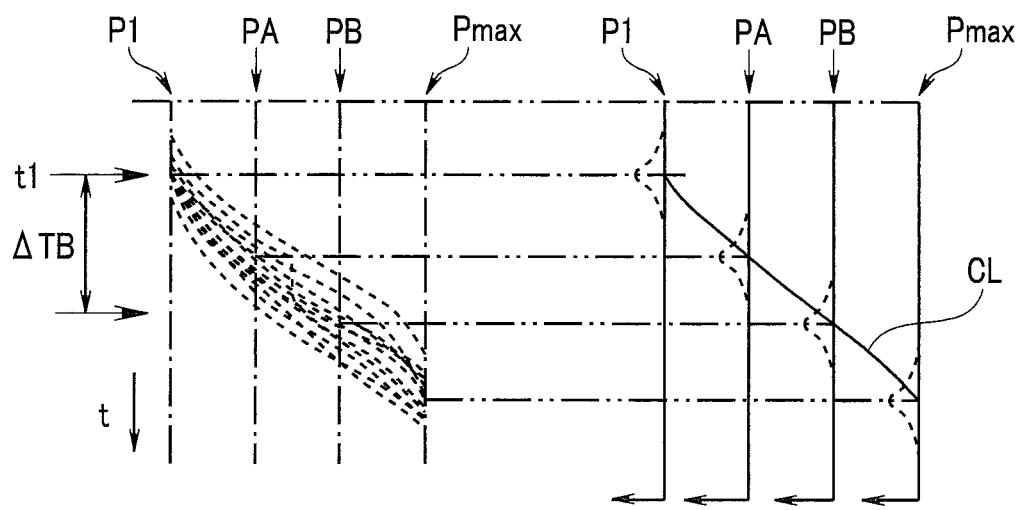
FIG. 16 describes a method for generating the correction curve CL in S22 based on a maximum luminance value contained in image data cut out in every predetermined cycle ΔTB according to the modification of the embodiment of the present invention.

FIG. 16 describes a method for generating the correction curve CL in S22 based on the maximum luminance value contained in image data cut out in every predetermined cycle ΔTB.

The correction curve CL is generated by connecting positions of the points of time when the luminance value is maximized in the pixel positions, as shown in FIG. 16. In FIG. 16, the positions of the points of time corresponding to peaks of distributions of the luminance values (indicated by dotted lines) in respective four pixel positions of the pixels P1, PA, PB, and Pmax are determined as the points of time when the maximum luminance occurs.

Also in FIG. 16, the position of ΔTB in FIG. 9 is set in the position of the average of the points of time when the pixel EP showing the maximum luminance value appears in the position of the pixel P1 on the trajectory of the pixel EP during the period for which the trajectory of the pixel EP that starts from the pixel P1 moves across the range of the linear image IPAi.

After S22, the correction table data generation process is carried out (S23). The process in S23 is the same as the process in S13.

The present modification therefore also allows generation of the correction table data in the correction table CT stored in the correction table storage unit 36.

As described above, the PC 12 is a correction information generation apparatus configured to generate the correction table CT, which is correction information. The processes in S12 and S22 described above form a position change information extraction unit configured to arrange linear images IPAi acquired with the linear sensor 26a along the time lapse and extract the position change information representing a change in the position of a pixel having a predetermined feature value or a pixel having a predetermined pixel value of the resultant image, such as the edge portion, on the linear image IPAi.

The position change information extraction unit, which is formed of the processes in S12 and S22, then generates a superimposed image obtained by superimposing a plurality of acquired images, the linear images IPAi in the description, on one another along the time lapse and extracts, from the superimposed image, the correction curve CL, which is on-image position change information on a change in the position of the pixel having a feature value or the pixel having a predetermined pixel value of the image. The position change information is information on the correction curve generated based on the trajectory of time-lapse, on-image positions of the pixel having an image feature value or the pixel having an image pixel value in the superimposed image.

Further, the processes in S13 and S23 described above form a correspondence information generation unit configured to generate information on the correspondence between the position of a pixel in the linear image IPAi and the angle of rotation of the blade groups, which are the inspection target, from the position change information extracted in S12 and S22. The correspondence information generation unit, which is formed of the processes in S13 and S23, generates, as the correspondence information, a correspondence table representing the correspondence between the position of the pixel in the image and the angle of rotation of the inspection target.

Figure 17:
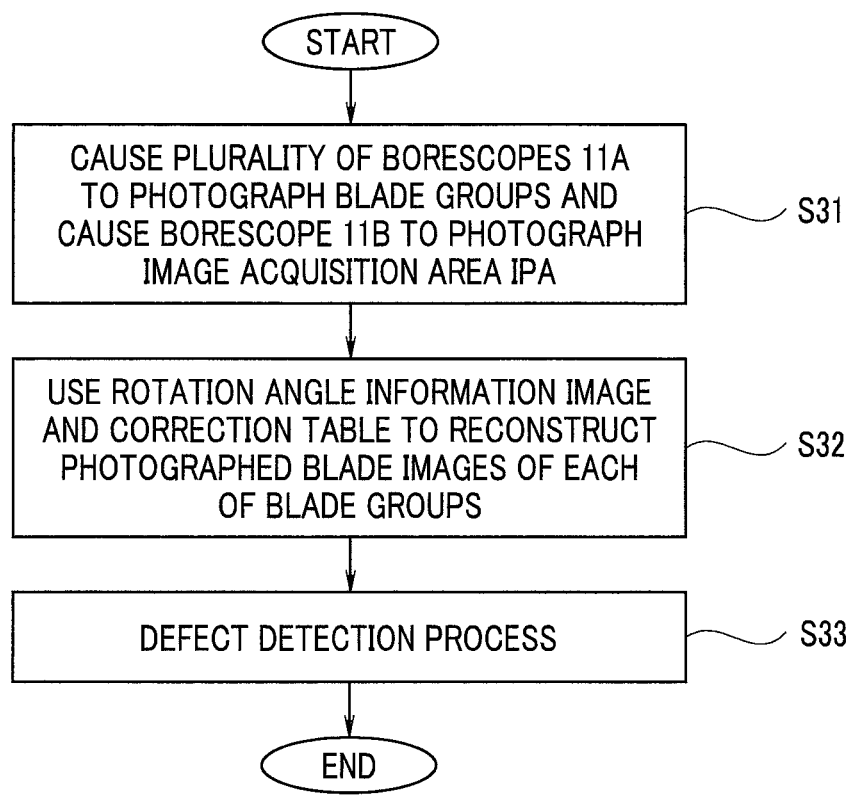
FIG. 17 is a flowchart showing an example of a procedure of a blade inspection process in S2 according to the embodiment of the present invention.

Referring back to FIG. 7, after the correction table is created, the control unit 31 carries out the blade inspection process (S2). FIG. 17 is a flowchart showing an example of the procedure of the blade inspection process.

The control unit 31 controls the trigger generation unit 32 to simultaneously supply the plurality of borescopes 11A and 11B with a trigger signal in the predetermined cycle ΔTI to cause the plurality of borescopes 11A to photograph the respective blade groups and the borescope 11B to photograph the image acquisition area IPA (S31). The process in S31 is carried out by the image record unit 33 and the rotation state record unit 34.

As a result, an image of each of the blade groups, that is, a linear image BT of each of the blades B (hereinafter referred to as blade linear image BI) is recorded in the image record unit 33. At the same time, the rotation state record unit 34 causes the borescope 11B to photograph the image acquisition area IPA to generate the rotation angle information image RS.

Figure 18:
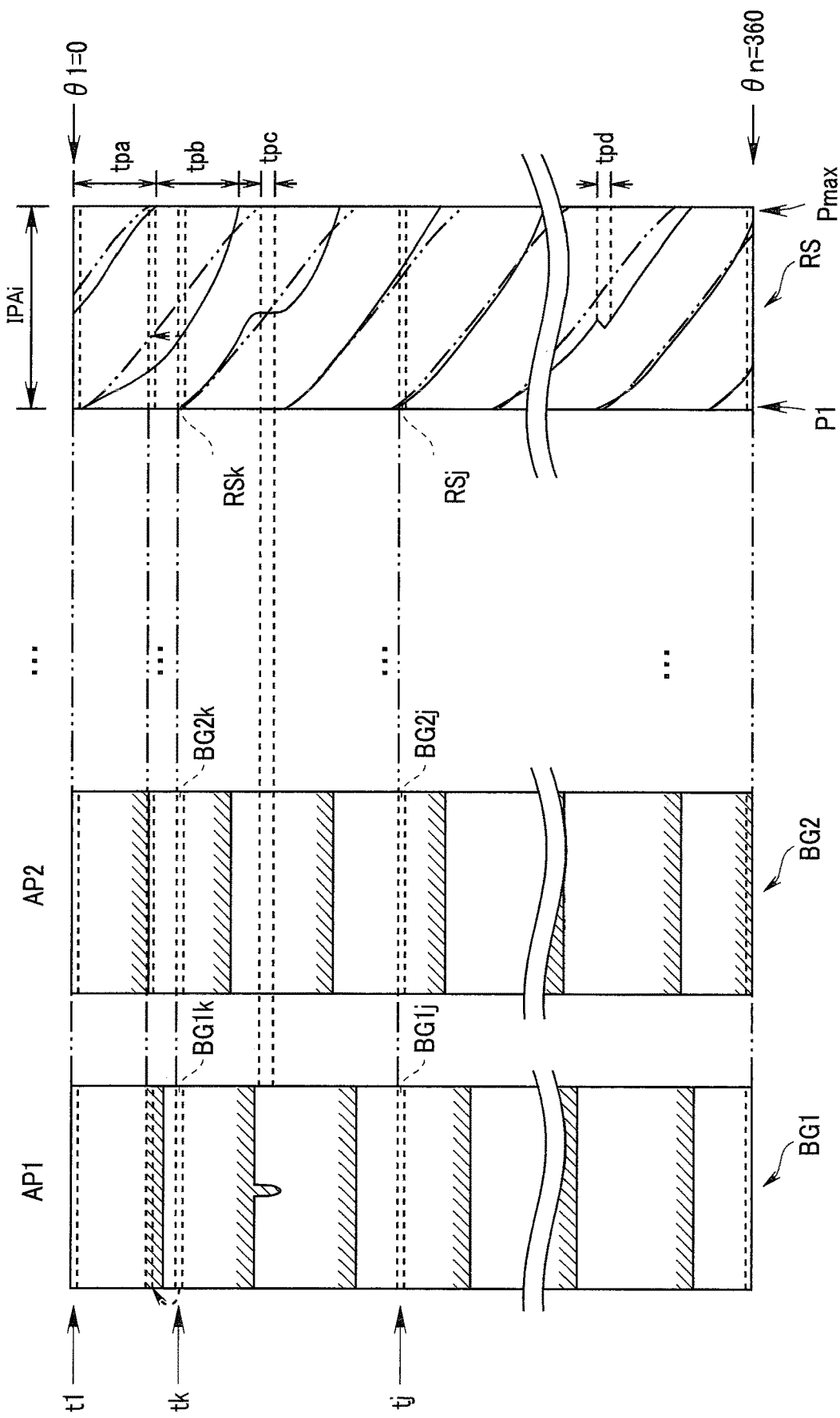
FIG. 18 shows correspondence between a plurality of blade linear images BI recorded in an image record unit 33 and a rotation angle information image RS recorded in a rotation state record unit 34 according to the embodiment of the present invention.

FIG. 18 shows correspondence between a plurality of blade linear images BI recorded in the image record unit 33 and the rotation angle information image RS recorded in the rotation state record unit 34. FIG. 18 shows two blade images BG1 and BG2 produced by the borescopes 11A in a first access port AP1 and a second access port AP2 and the rotation angle information image RS produced by the borescope 11B in the access port for the borescope 11B.

In FIG. 18, the lapse of the time t of each of the blade linear images BI coincides with the lapse of the time t of the rotation angle information image RS. That is, image data on the each of blade linear images BI and image data on the rotation angle information image RS in the same position in a vertical axis in FIG. 18 are image data photographed and produced at the same timing. For example, image data BG1$j$, BG2$j$, . . . on the respective blade linear images BI and image data RS$j$ on the rotation angle information image RS at time t$j$ are image data photographed at the same timing.

In FIG. 18, in the rotation angle information image RS, the rotary shaft AR rotates slowly in a period tpa in the lapse of the time t, and the pixel EP appears temporally after the pixel EP appears in the case where no rotation unevenness is present and which is indicated by the two-dot chain lines.

The rotary shaft AR rotates faster in a second half of a period tpb, and the pixel EP appears temporally before the pixel EP appears in the case where no rotation unevenness is present and which is indicated by the two-dot chain lines.

Further, the rotary shaft AR stops rotating in a period tpc, and the pixel EP is successively present in the same pixel position.

The rotary shaft AR temporarily rotates in a reversed direction in a period tpd, and the position of the pixel EP primarily moves toward the pixel P1 side and then resumes moving in the intended direction.

As described above, the rotation unevenness occurs in a variety of manners, and a plurality of blade linear image BI and the rotation angle information image RS in the same position in the vertical axis direction are time-course image information formed of pieces of image data photographed at the same timing and arranged along the time lapse.

The position of the pixel EP corresponding to each edge portion BE corresponds to the amount of angular change $\Delta\theta\alpha$ in the cycle $\Delta TB$, as shown in FIG. 9. Information in the correction table CT corresponding to the correction curve CC in FIG. 9 is created in S13 (or S23) and stored in the correction table storage unit 36.

The control unit 31 therefore uses the rotation angle information image RS created in S31 and the correction table CT created in S13 (or S23) to reconstruct the blade images of each of the blade groups photographed by the plurality of borescopes 11A and created in S31 (S32).

Specifically, the correction table CT stored in the correction table storage unit 36 is a table corresponding to the correction curve CC in the case where no rotation unevenness is present, such as the case shown in FIG. 8. Based on the correction table CT, the control unit 31 arranges the correction table CT corresponding to the correction curve CC in every cycle $\Delta TB$ to create a rotation angle information image RSR showing a trajectory of the pixel EP in the case where no rotation unevenness is present, such as the case shown in FIG. 8. The control unit 31 then reconstructs the blade images in such a way that the image data on the respective blade groups obtained in S31 are rearranged (including movement, deletion, duplication, interpolation, and other types of operation) in image data positions where the positions of the pixel EP in the respective image data in the rotation angle information image RSR coincide with one another.

For example, image data BG1$k$, BG2$k$, . . . on the respective blade images BG1, BG2, . . . at time t$k$ are moved to the positions of points of time where the image data BG1$k$, BG2$k$, . . . are supposed to be present in the case where no rotation unevenness is present, as indicated by dotted lines in FIG. 18.

That is, the image data on the respective blade images BG1, BG2, . . . obtained in S31 are so moved, deleted, or otherwise processed based on the rotation angle information image RS obtained in S31 and the correction table CT stored in the correction table storage unit 36 that the respective blade images BG1, BG2, . . . are changed to images at the time when the rotary shaft AR rotates at a constant speed, whereby the respective blade images BG1, BG2, . . . are so reconstructed that a constant change in the angle of rotation with time is achieved.

As described above, the process in S32 forms an image data reconstruction unit configured to reconstruct image data on each inspection target image acquired with the linear sensor 23$a$ in accordance with the angle of rotation of the inspection target based on the time-course image information in which inspection target images acquired with the linear sensor 26$a$ are arranged along the time lapse and the correction table CT, which is the information on the correspondence between the position of the pixel having a predetermined feature value or a predetermined luminance value in each of the inspection target images and the amount of the angle of rotation of the inspection target. The pixel in the correspondence information is a pixel having the predetermined feature value or the predetermined luminance value in each of the images of the plurality of blades B. The image data reconstruction unit, which is formed of the process in S32, reconstructs the respective image data on the inspection target images produced by the borescopes 11A by arranging the image data each produced in every cycle $\Delta TI$, which is the predetermined time interval, based on the correction table CT, which is the correspondence information.

Figure 19:
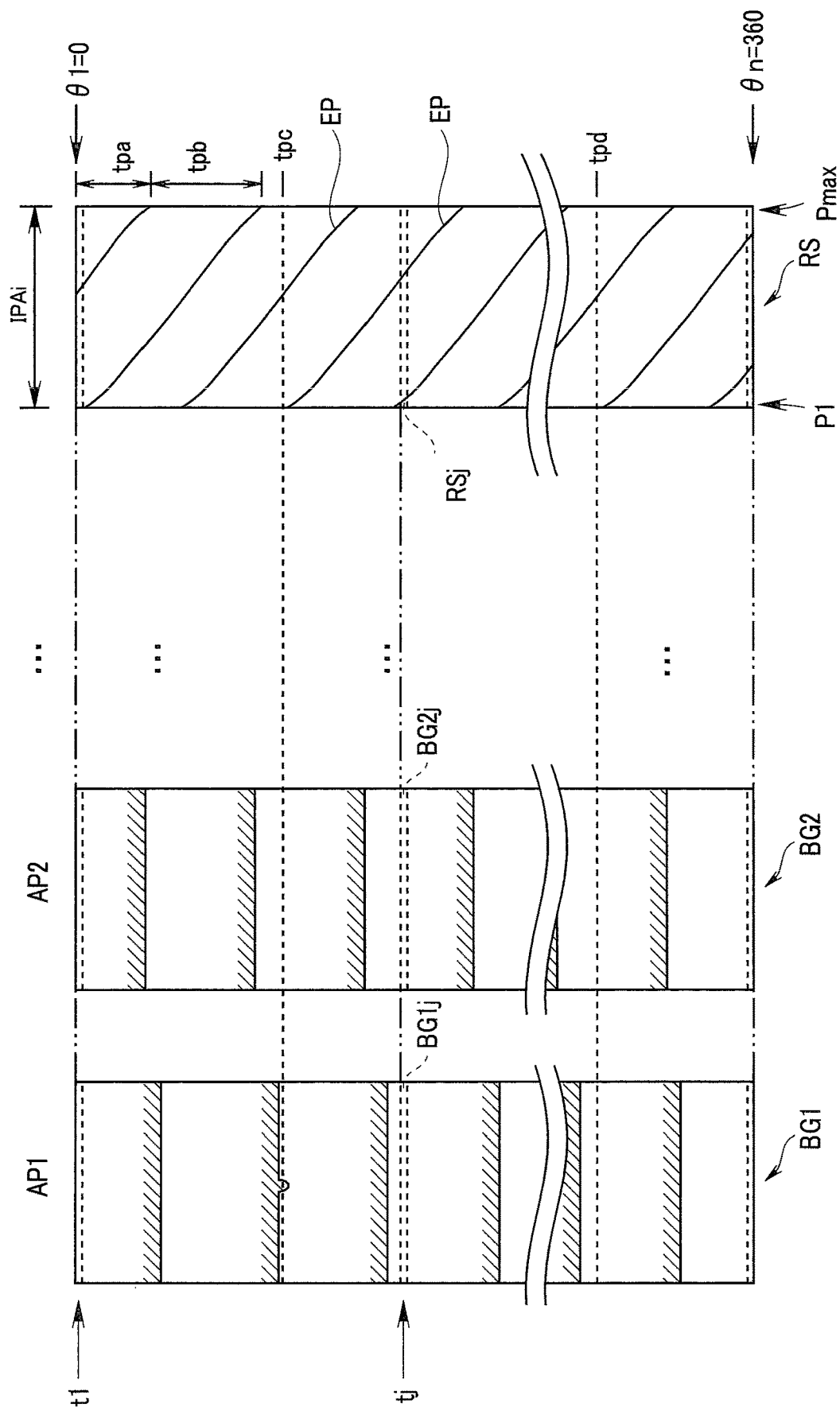
FIG. 19 shows correspondence between the plurality of blade linear images BI recorded in the image record unit 33 and the rotation angle information image RS after the reconstruction of the blade images according to the embodiment of the present invention.

FIG. 19 shows correspondence between the plurality of blade linear images BI recorded in the image record unit 33 and the rotation angle information image RS after the reconstruction of the blade images.

In the reconstruction process in S32, part of the image data BG1$j$, BG2$j$, . . . on the respective blade linear images BI in the period tpa is deleted, for example, in a decimation process, so that the period tpa is shortened. The image data BG1$j$, BG2$j$, . . . on the respective blade linear images BI in the period tpb are combined with an added data by duplication, interpolation, and other types of operation, so that the period tpb is prolonged.

The image data BG1$j$, BG2$j$, on the respective blade linear images BI in the period tpc have lost image data during the stationary period, for example, by deletion. As a result, in FIG. 18, a cut-out portion of part of the blades B is expanded and hence enlarged because the rotary shaft AR stopped rotating, whereas in FIG. 19, the image data during the non-rotating period is deleted so that the cut-out portion is so corrected as to have a non-expanded size.

The image data BG1$j$, BG2$j$, . . . on the respective blade linear images BI in the period tpd have lost image data during the reversed rotation, for example, by deletion.

In other words, the respective image data on the reconstructed blade images are image data obtained by rearranging the image data BG1$j$, BG2$j$, . . . on the respective blade linear images BI photographed at the predetermined time intervals in such a way that the image data are arranged at constant time intervals.

As a result, the image data BG1$j$, BG2$j$, . . . on the respective blade linear images BI reconstructed in S32 are changed to image data obtained when the rotary shaft AR rotates at a constant rotation speed with no rotation unevenness.

The control unit 31 causes the image data BG1$j$, BG2$j$, . . . on the respective blade linear images BI obtained in S32 to undergo a predetermined defect process (S33). In the defect process, for example, evaluation of whether or not a defect is present, determination of the type of the defect, measurement of the size of the defect, and other types of operation are performed with the aid of image processing.

Figure 20:
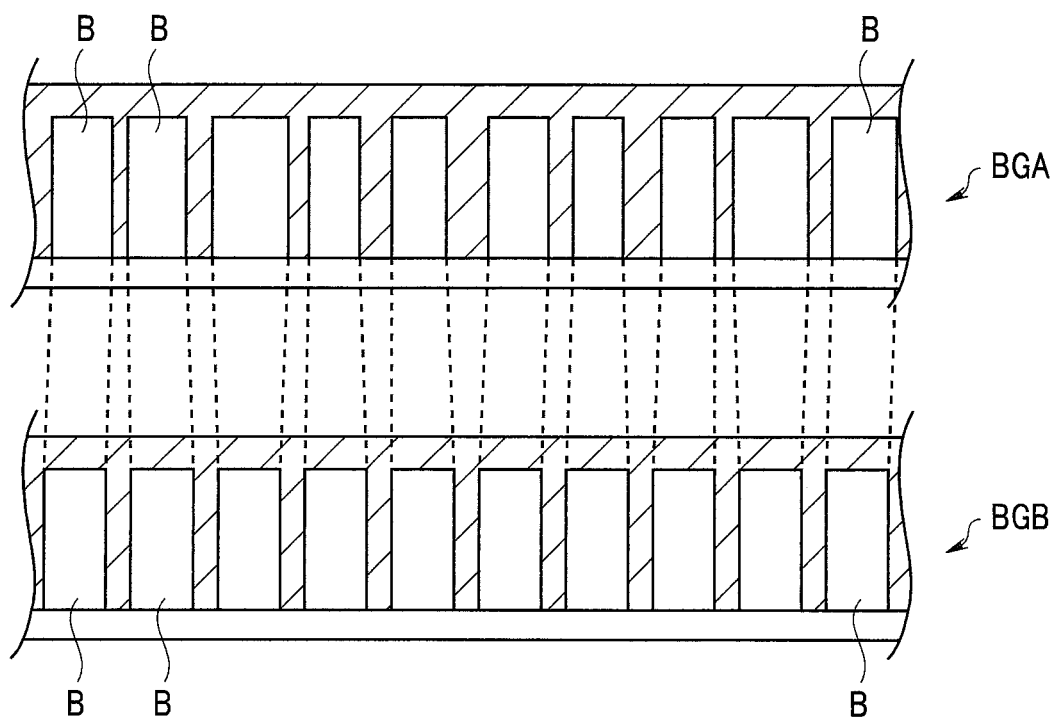
FIG. 20 describes an image of blade groups produced by an endoscope system 1 according to the embodiment of the present invention.

FIG. 20 describes an image of the blade groups produced by the endoscope system 1 according to the embodiment described above.

In FIG. 20, part of the image of the blade groups in an upper portion shows an image BGA of the blade groups before the reconstruction using the correction table CT, and part of the image of the blade groups in the lower portion shows an image BGB of the blade groups after the reconstruction using the correction table CT.

In the image BGA of the blade groups before the reconstruction in S32, the widths of the respective blades B in the rotation direction vary due to the rotation unevenness of the rotary shaft AR, but in the image BGB of the blade groups after the reconstruction in S32, the widths of the respective blades B in the rotation direction are equal to one another.

As described above, the embodiment described above can provide an endoscope system configured to allow acquisition of an endoscope image free of an effect of rotation unevenness of an inspection target from an endoscope image produced by rotating the inspection target.

The embodiment described above can further provide a correction information generation apparatus configured to generate correction information for acquiring an inspection image free of an effect of rotation unevenness of an inspection target and a correction information generation method for correcting an image of a rotating inspection target.

In the embodiment described above, the correction curve CC is calculated by actually driving the engine E to create the correction table CT. Instead, a correction table may be calculated from information on design or specifications of the engine E and stored in the correction table storage unit 36 in advance, and the thus calculated and stored correction table CT may be used. That is, the correspondence information representing the correspondence between the position of a pixel having a predetermined feature value or a predetermined luminance value in the linear image IPAi and the amount of the angle of rotation of the inspection target may be information set in advance based, for example, on information on design of the inspection target.

Further, in the example described above, the borescope 11B photographs the edge portion BE of each blade B. Instead, a predetermined mark may be provided, for example, on the rotary shaft AR at the root of each of the blades B, and the mark may be photographed, followed by creation of the correction table. Since the rotary shaft AR or any other portion at the root of the blades B is not damaged by use of the engine E, information on the rotation state can be acquired in a more reliable manner.

The present invention is not limited to the embodiment described above, and a variety of changes, modifications, and other improvements are conceivable to the extent that the changes, modifications, and other improvements do not change the substance of the present invention.

What is claimed is:

1. A correction information generation apparatus comprising:
   an image sensor configured to acquire a plurality of images along a rotating direction of an inspection target at predetermined time intervals; and
   a processor configured to:
      extract position change information representing a change in an on-image position of a pixel including a predetermined feature value or a predetermined pixel value of the acquired images along a time lapse;
      generate information on correspondence between the position of the pixel in each of the images and an angle of rotation of the inspection target from the position change information;
      replace each of the plurality of images acquired at the predetermined time intervals with pixel information representing the position of the pixel including the predetermined feature value or the pixel including the predetermined pixel value, and arrange resulting images acquired by the replacement in a direction of a temporal axis, to generate a rotation angle information image as first information of the information on the correspondence; and
      generate a superimposed image in which trajectories of the pixel including the predetermined feature value or of the pixel including the predetermined pixel value in the rotation angle information image are superimposed on one another, with predetermined pixel positions being coincident with one another, calculate an average point from a plurality of curves of the superimposed trajectories of the pixel including the predetermined feature value or of the pixel including the predetermined pixel value, to generate a correction curve, and calculate, from the generated correction curve, a correction table, as second information of the information on the correspondence.

2. The correction information generation apparatus according to claim 1, wherein the feature value is a value representing an edge in each of the images.

3. The correction information generation apparatus according to claim 1, wherein the superimposed image is an image formed by extracting the plurality of images including the pixel value in every predetermined cycle and superimposing the images on one another.

4. The correction information generation apparatus according to claim 1, wherein the image sensor comprises a linear sensor, and the images are each a linear image.

5. A correction information generation method for correcting an image of a rotating inspection target, the method comprising:
   acquiring a plurality of images along a rotating direction of the inspection target at predetermined time intervals;
   extracting position change information representing a change in an on-image position of a pixel including a predetermined feature value or a predetermined pixel value of the acquired images along a time lapse;
   generating information on correspondence between the position of the pixel in each of the images and an angle of rotation of the inspection target from the position change information;
   replacing each of the plurality of images acquired at the predetermined time intervals with pixel information representing the position of the pixel including the predetermined feature value or the pixel including the predetermined pixel value, and arranging resulting images acquired by the replacement in a direction of a temporal axis, to generate a rotation angle information image as first information of the information on the correspondence; and
   generating a superimposed image in which trajectories of the pixel including the predetermined feature value or of the pixel including the predetermined pixel value in the rotation angle information image are superimposed on one another, with predetermined pixel positions being coincident with one another, calculating an average point from a plurality of curves of the superimposed trajectories of the pixel including the predetermined feature value or of the pixel including the predetermined pixel value, to generate a correction curve, and calculating, from the generated correction curve, a correction table, as second information of the information on the correspondence.

6. The correction information generation apparatus according to claim 1,
   wherein the processor is configured to correct an image of the rotating inspection target based on the first information and the second information of the information on the correspondence.

7. The correction information generation method according to claim 5, further comprising:
   correcting an image of the rotating inspection target based on the first information and the second information of the information on the correspondence.

\* \* \* \* \*